United States Patent
Stoia et al.

(10) Patent No.: US 10,145,561 B2
(45) Date of Patent: Dec. 4, 2018

(54) FUEL NOZZLE ASSEMBLY WITH RESONATOR

(71) Applicant: General Electric Company, Schenectady, NY (US)

(72) Inventors: Lucas John Stoia, Taylors, SC (US); Donald Mark Bailey, Simpsonville, SC (US); Sven Georg Bethke, Greenville, SC (US); Mohan Krishna Bobba, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 287 days.

(21) Appl. No.: 15/256,771

(22) Filed: Sep. 6, 2016

(65) Prior Publication Data

US 2018/0066847 A1    Mar. 8, 2018

(51) Int. Cl.
| | | |
|---|---|---|
| F23R 3/28 | (2006.01) | |
| F02C 3/04 | (2006.01) | |
| F02C 7/22 | (2006.01) | |

(52) U.S. Cl.
CPC ............. F23R 3/286 (2013.01); F02C 3/04 (2013.01); F02C 7/222 (2013.01); F05D 2220/32 (2013.01); F05D 2240/35 (2013.01); F23R 2900/00014 (2013.01)

(58) Field of Classification Search
CPC .. F23R 3/28; F23R 3/286; F23R 2900/00014; F02C 3/04; F02C 7/222; F01N 1/023
See application file for complete search history.

(56) References Cited

U.S. PATENT DOCUMENTS

| | | | |
|---|---|---|---|
| 3,771,500 A | 11/1973 | Shakiba | |
| 4,104,873 A | 8/1978 | Coffinbeny | |
| 4,412,414 A | 11/1983 | Novick et al. | |
| 5,104,310 A | 4/1992 | Saltin | |
| 5,205,120 A | 4/1993 | Oblander et al. | |
| 5,213,494 A | 5/1993 | Jeppesen | |
| 5,341,645 A | 8/1994 | Ansart et al. | |
| 5,439,532 A | 8/1995 | Fraas | |
| 5,592,819 A | 1/1997 | Ansart et al. | |
| 5,707,591 A | 1/1998 | Semedard et al. | |
| 6,098,407 A | 8/2000 | Korzendorfer et al. | |
| 6,123,542 A | 9/2000 | Joshi et al. | |
| 6,351,947 B1* | 3/2002 | Keller | F23R 3/002 60/725 |
| 6,370,879 B1* | 4/2002 | Stalder | F23D 14/46 431/114 |
| 6,394,791 B2 | 5/2002 | Smith et al. | |

(Continued)

FOREIGN PATENT DOCUMENTS

WO    2015/176887 A1    11/2015

OTHER PUBLICATIONS

Extended European Search Report and Opinion issued in connection with corresponding EP Application No. 17189350.6 dated Jan. 15, 2018.

*Primary Examiner* — Craig Kim
(74) *Attorney, Agent, or Firm* — Dority & Manning, P.A.

(57) ABSTRACT

A bundled tube fuel nozzle assembly including a fuel plenum and an air plenum. A plurality of mixing tubes extend through the fuel plenum and the air plenum. At least one resonator is positioned in the air plenum surrounding at least one of the plurality of mixing tubes.

18 Claims, 9 Drawing Sheets

(56) References Cited

U.S. PATENT DOCUMENTS

| | | | |
|---|---|---|---|
| 6,430,933 B1* | 8/2002 | Keller | F23C 9/006 431/115 |
| 6,438,961 B2 | 8/2002 | Tuthill et al. | |
| 6,530,221 B1 | 3/2003 | Sattinger et al. | |
| 6,796,790 B2 | 9/2004 | Venizelos et al. | |
| 6,820,431 B2* | 11/2004 | McManus | F23M 20/00 431/44 |
| 6,983,600 B1 | 1/2006 | Dinu et al. | |
| 7,003,958 B2 | 2/2006 | Dinu et al. | |
| 7,007,478 B2 | 3/2006 | Dinu | |
| 7,117,974 B2* | 10/2006 | Moenssen | F02M 35/1216 181/277 |
| 7,413,053 B2 | 8/2008 | Wasif et al. | |
| 7,631,499 B2 | 12/2009 | Bland | |
| 7,752,850 B2 | 7/2010 | Laster et al. | |
| 8,127,546 B2* | 3/2012 | Park | F23R 3/28 181/213 |
| 8,157,189 B2 | 4/2012 | Johnson et al. | |
| 8,789,372 B2 | 7/2014 | Johnson et al. | |
| 8,800,289 B2 | 8/2014 | Johnson et al. | |
| 8,984,887 B2 | 3/2015 | Berry | |
| 9,010,083 B2 | 4/2015 | Uhm et al. | |
| 9,388,985 B2 | 7/2016 | Wu et al. | |
| 2004/0216463 A1 | 11/2004 | Harris | |
| 2005/0229581 A1* | 10/2005 | Bellucci | F23D 11/402 60/39.17 |
| 2006/0000220 A1* | 1/2006 | Sattinger | F02C 7/222 60/776 |
| 2008/0016876 A1 | 1/2008 | Colibaba-Evulet et al. | |
| 2008/0304958 A1 | 12/2008 | Norris et al. | |
| 2009/0297996 A1 | 12/2009 | Vatsky et al. | |
| 2010/0008179 A1 | 1/2010 | Lacy et al. | |
| 2010/0024426 A1 | 2/2010 | Varatharajan et al. | |
| 2010/0031662 A1 | 2/2010 | Zuo | |
| 2010/0060391 A1 | 3/2010 | Ristola et al. | |
| 2010/0084490 A1 | 4/2010 | Zuo et al. | |
| 2010/0089367 A1 | 4/2010 | Johnson et al. | |
| 2010/0095676 A1 | 4/2010 | Uhm et al. | |
| 2010/0139280 A1 | 6/2010 | Lacey et al. | |
| 2010/0186413 A1 | 7/2010 | Lacey et al. | |
| 2010/0192581 A1 | 8/2010 | Ziminsky et al. | |
| 2010/0218501 A1 | 9/2010 | York et al. | |
| 2010/0236247 A1 | 9/2010 | Davis, Jr. et al. | |
| 2010/0252652 A1 | 10/2010 | Johnson et al. | |
| 2010/0287942 A1 | 11/2010 | Zuo et al. | |
| 2011/0016871 A1 | 1/2011 | Kraemer et al. | |
| 2011/0072824 A1 | 3/2011 | Zuo et al. | |
| 2011/0073684 A1 | 3/2011 | Johnson et al. | |
| 2011/0083439 A1 | 4/2011 | Zuo et al. | |
| 2011/0089266 A1 | 4/2011 | Stoia et al. | |
| 2011/0179795 A1* | 7/2011 | Johnson | F23R 3/28 60/725 |
| 2012/0058437 A1 | 3/2012 | Uhm et al. | |
| 2013/0019602 A1* | 1/2013 | Kim | F23R 3/10 60/725 |
| 2013/0305734 A1 | 11/2013 | Keener et al. | |
| 2014/0013756 A1 | 1/2014 | Melton et al. | |
| 2014/0311156 A1* | 10/2014 | Tretyakov | F23R 3/10 60/779 |
| 2015/0167980 A1* | 6/2015 | Pent | F23R 3/16 60/746 |

\* cited by examiner

FUEL NOZZLE ASSEMBLY WITH RESONATOR

FIELD OF THE TECHNOLOGY

The present invention generally involves a bundled tube type fuel nozzle assembly for a gas turbine combustor. More specifically, the invention relates to a bundled tube type fuel nozzle assembly with a high frequency dynamics resonator incorporated therein.

BACKGROUND

Particular combustion systems for gas turbine engines utilize combustors having bundled tube type fuel nozzles for premixing a gaseous fuel with compressed air upstream from a combustion zone. A bundled tube type fuel nozzle assembly generally includes multiple tubes that extend through a fuel plenum body which is at least partially defined by a forward plate, an aft plate and an outer sleeve. Compressed air flows into an inlet portion of each tube. Fuel from the fuel plenum is injected into each tube where it premixes with the compressed air before it is routed into the combustion zone.

A portion of each tube may be rigidly connected to the aft plate while a downstream end or tip portion is unconstrained, i.e., each tube is cantilevered from the aft plate. The downstream end or tip portion of each tube extends through a corresponding tube opening defined in a cap plate which is axially spaced from the aft plate of the fuel plenum body and positioned proximate to the combustion chamber. A circumferentially continuous radial gap is defined between an outer surface of each tube at its tip portion and the corresponding tube opening in the cap plate to allow for a cooling fluid, such as compressed air, to flow around the tube towards the combustion chamber, thereby cooling the tip portion. During operation, combustion dynamics may cause oscillation of the various components resulting in undesirable impacts between the components and increased wear thereof, e.g., the tip portion of each tube may vibrate within the gap potentially resulting in undesirable contact between the individual tubes and the cap plate.

BRIEF DESCRIPTION OF THE TECHNOLOGY

Aspects and advantages are set forth below in the following description, or may be obvious from the description, or may be learned through practice.

One embodiment of the present disclosure is a bundled tube fuel nozzle assembly. The fuel nozzle assembly includes a fuel plenum body including a forward plate extending in a radial direction, an aft plate axially spaced from the forward plate and extending in a radial direction, an outer sleeve extending in an axial direction between the forward plate and the aft plate, and a fuel plenum defined by the forward plate, the aft plate and the outer sleeve. The fuel nozzle assembly also includes a cap plate axially spaced from the aft plate with an air plenum defined between the aft plate and the cap plate. The fuel nozzle assembly further includes a plurality of mixing tubes extending through the fuel plenum body. Each of the mixing tubes includes an air inlet, a fuel port in fluid communication with the fuel plenum, and an outlet downstream of the aft plate. The fuel nozzle assembly also includes at least one resonator positioned between the aft plate and the cap plate surrounding at least one mixing tube of the plurality of mixing tubes. The at least one resonator includes a first sidewall extending in a radial direction, a second sidewall axially spaced from the first sidewall and extending in a radial direction, an outer wall extending in an axial direction between the first sidewall and the second sidewall, such that a resonator chamber is defined by the first sidewall, the second sidewall, and the outer wall. At least one inlet into the resonator chamber is in fluid communication with the air plenum. The at least one mixing tube surrounded by the at least one resonator comprises an opening in fluid communication with the resonator chamber.

Another embodiment of the present disclosure is a combustor. The combustor includes an end cover coupled to an outer casing and a bundled tube fuel nozzle assembly disposed within the outer casing and coupled to the end cover. The fuel nozzle assembly includes a fuel plenum body including a forward plate extending in a radial direction, an aft plate axially spaced from the forward plate and extending in a radial direction, an outer sleeve extending in an axial direction between the forward plate and the aft plate, and a fuel plenum defined by the forward plate, the aft plate and the outer sleeve. The fuel nozzle assembly also includes a cap plate axially spaced from the aft plate with an air plenum defined between the aft plate and the cap plate. The fuel nozzle assembly further includes a plurality of mixing tubes extending through the fuel plenum body. Each of the mixing tubes includes an air inlet, a fuel port in fluid communication with the fuel plenum, and an outlet downstream of the aft plate. The fuel nozzle assembly also includes at least one resonator positioned between the aft plate and the cap plate surrounding at least one mixing tube of the plurality of mixing tubes. The at least one resonator includes a first sidewall extending in a radial direction, a second sidewall axially spaced from the first sidewall and extending in a radial direction, an outer wall extending in an axial direction between the first sidewall and the second sidewall, such that a resonator chamber is defined by the first sidewall, the second sidewall, and the outer wall, at least one inlet into the resonator chamber in fluid communication with the air plenum. The at least one mixing tube surrounded by the at least one resonator also includes an opening in fluid communication with the resonator chamber.

Another embodiment of the present disclosure is a gas turbine including a compressor, a turbine, and a combustor disposed downstream from the compressor and upstream from the turbine. The combustor includes an end cover coupled to an outer casing and a bundled tube fuel nozzle assembly disposed within the outer casing and coupled to the end cover. The bundled tube fuel nozzle assembly includes a fuel plenum body including a forward plate extending in a radial direction, an aft plate axially spaced from the forward plate and extending in a radial direction, an outer sleeve extending in an axial direction between the forward plate and the aft plate, and a fuel plenum defined by the forward plate, the aft plate and the outer sleeve. The fuel nozzle assembly also includes a cap plate axially spaced from the aft plate with an air plenum defined between the aft plate and the cap plate. The fuel nozzle assembly further includes a plurality of mixing tubes extending through the fuel plenum body. Each of the mixing tubes includes an air inlet, an outlet downstream of the aft plate, and a fuel port in fluid communication with the fuel plenum. The fuel nozzle assembly also includes at least one resonator positioned between the aft plate and the cap plate surrounding at least one mixing tube of the plurality of mixing tubes. The at least one resonator includes a first sidewall extending in a radial direction, a second sidewall axially spaced from the first sidewall and extending in a radial direction, an outer wall extending in an axial direction between the first sidewall and the second sidewall, a resonator chamber defined by the first sidewall, the second sidewall, and the outer wall, and at least one inlet into the resonator chamber in fluid communication with the air plenum. The at least one mixing tube surrounded by the at least one resonator also includes an opening in fluid communication with the resonator chamber.

Those of ordinary skill in the art will better appreciate the features and aspects of such embodiments, and others, upon review of the specification.

BRIEF DESCRIPTION OF THE DRAWINGS

A full and enabling disclosure of the of various embodiments, including the best mode thereof to one skilled in the art, is set forth more particularly in the remainder of the specification, including reference to the accompanying figures, in which.

DETAILED DESCRIPTION

Figure 1:
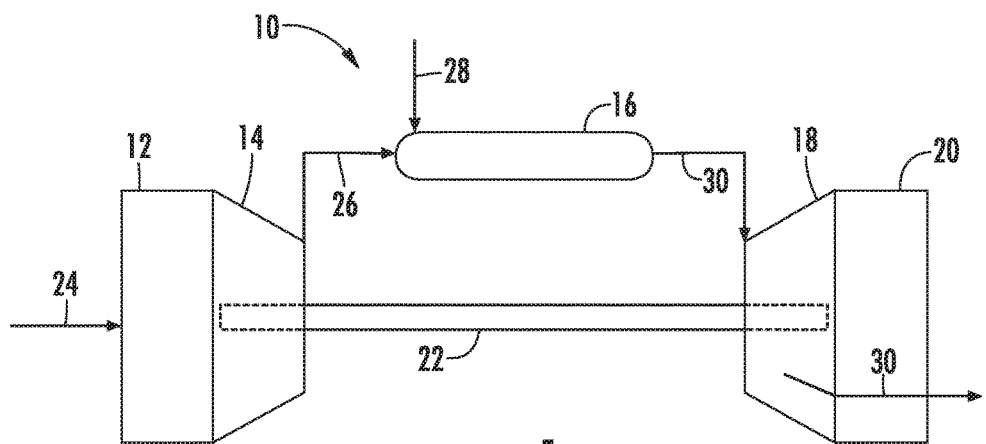
FIG. 1 is a functional block diagram of an exemplary gas turbine that may incorporate various embodiments of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component, and the term "circumferentially" refers to the relative direction that extends around the axial centerline of a particular component.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents. For instance, the high frequency dynamics resonator may be tuned to dampen oscillations of a certain frequency or range of frequencies, such as by varying the dimensions of the resonator chambers and/or mixing tube openings. Further by way of example, more than one resonator may be used, which may all be tuned to the same frequency range, or different resonators may be tuned to dampen different ranges. In combustion cans having more than one bundled tube type fuel nozzle, resonators tuned to dampen different frequency ranges may be used to mitigate dynamics from a first fuel nozzle and a second fuel nozzle. Alternatively, or in addition, in combustion systems with multiple combustion cans, a bundled tube type fuel nozzle in a first combustor may be provided with a resonator tuned to a first frequency range, while a bundled tube type fuel nozzle in a second combustor may be provided with a resonator tuned to a second frequency range different from the first frequency range.

Although exemplary embodiments of the present disclosure will be described generally in the context of a fuel nozzle assembly for a land based power generating gas turbine combustor for purposes of illustration, one of ordinary skill in the art will readily appreciate that embodiments of the present disclosure may be applied to any style or type of combustor for a turbomachine and are not limited to combustors or combustion systems for land based power generating gas turbines unless specifically recited in the claims.

Referring now to the drawings, FIG. 1 illustrates a schematic diagram of an exemplary gas turbine 10. The gas turbine 10 generally includes an inlet section 12, a compressor 14 disposed downstream of the inlet section 12, at least one combustor 16 disposed downstream of the compressor 14, a turbine 18 disposed downstream of the combustor 16 and an exhaust section 20 disposed downstream of the turbine 18. Additionally, the gas turbine 10 may include one or more shafts 22 that couple the compressor 14 to the turbine 18.

During operation, air 24 flows through the inlet section 12 and into the compressor 14 where the air 24 is progressively compressed, thus providing compressed air 26 to the combustor 16. At least a portion of the compressed air 26 is mixed with a fuel 28 within the combustor 16 and burned to produce combustion gases 30. The combustion gases 30 flow from the combustor 16 into the turbine 18, wherein energy (kinetic and/or thermal) is transferred from the combustion gases 30 to rotor blades (not shown), thus causing shaft 22 to rotate. The mechanical rotational energy may then be used for various purposes such as to power the compressor 14 and/or to generate electricity. The combustion gases 30 exiting the turbine 18 may then be exhausted from the gas turbine 10 via the exhaust section 20.

Figure 2:
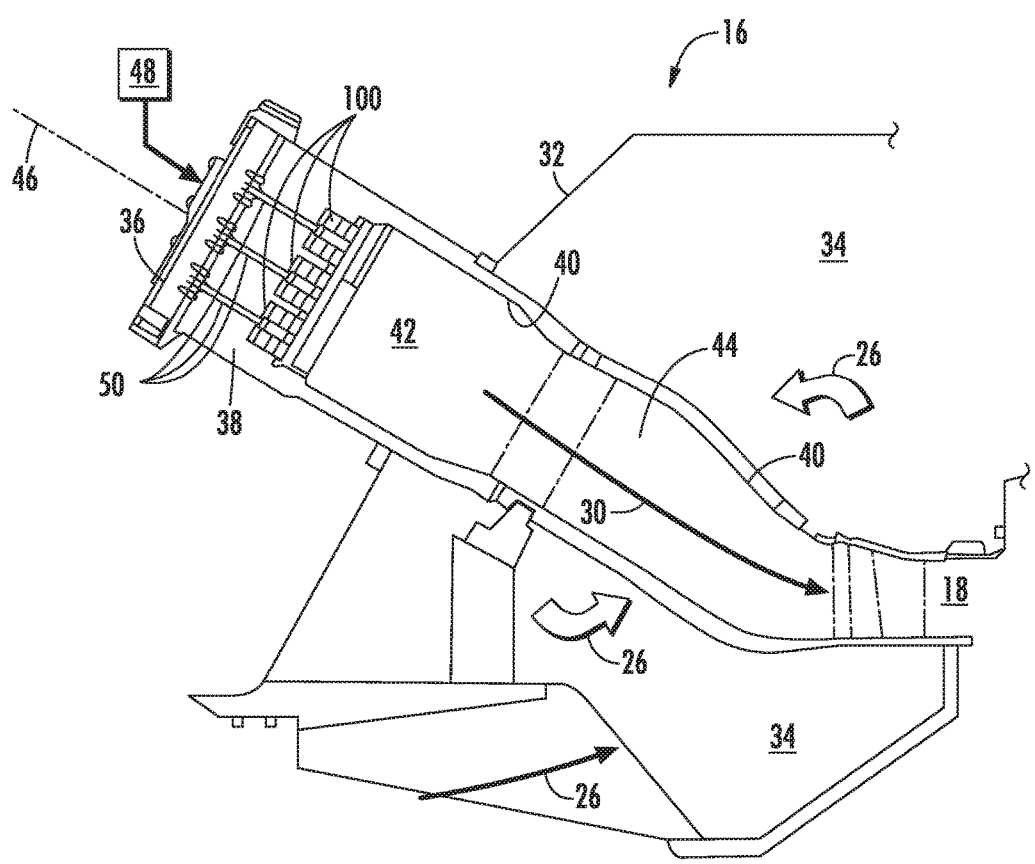
FIG. 2 is a simplified cross-section side view of an exemplary combustor as may incorporate various embodiments of the present disclosure.

As shown in FIG. 2, the combustor 16 may be at least partially surrounded by an outer casing 32 such as a compressor discharge casing. The outer casing 32 may at least partially define a high pressure plenum 34 that at least partially surrounds various components of the combustor 16. The high pressure plenum 34 may be in fluid communication with the compressor 14 (FIG. 1) so as to receive the compressed air 26 therefrom. An end cover 36 may be coupled to the outer casing 32. In particular embodiments, the outer casing 32 and the end cover 36 may at least partially define a head end volume or portion 38 of the combustor 16.

In particular embodiments, the head end portion 38 is in fluid communication with the high pressure plenum 34 and/or the compressor 14. One or more liners or ducts 40 may at least partially define a combustion chamber or zone 42 for combusting the fuel-air mixture and/or may at least partially define a hot gas path 44 through the combustor, for directing the combustion gases 30 towards an inlet to the turbine 18.

In various embodiments, the combustor 16 includes at least one bundled tube type fuel nozzle assembly 100. As shown in FIG. 2, the fuel nozzle assembly 100 is disposed within the outer casing 32 downstream from and/or axially spaced from the end cover 36 with respect to axial centerline 46 of the combustor 16 and upstream from the combustion chamber 42. In particular embodiments, the fuel nozzle assembly 100 is in fluid communication with a gas fuel supply 48 via one or more fluid conduits 50. In particular embodiments, the fluid conduit(s) 50 may be fluidly coupled and/or connected at one end to the end cover 36. It should be understood that the fuel nozzle assemblies 100 and/or the fluid conduit(s) may be mounted to structures other than the end cover 36 (e.g., the outer casing 32).

Figure 3:
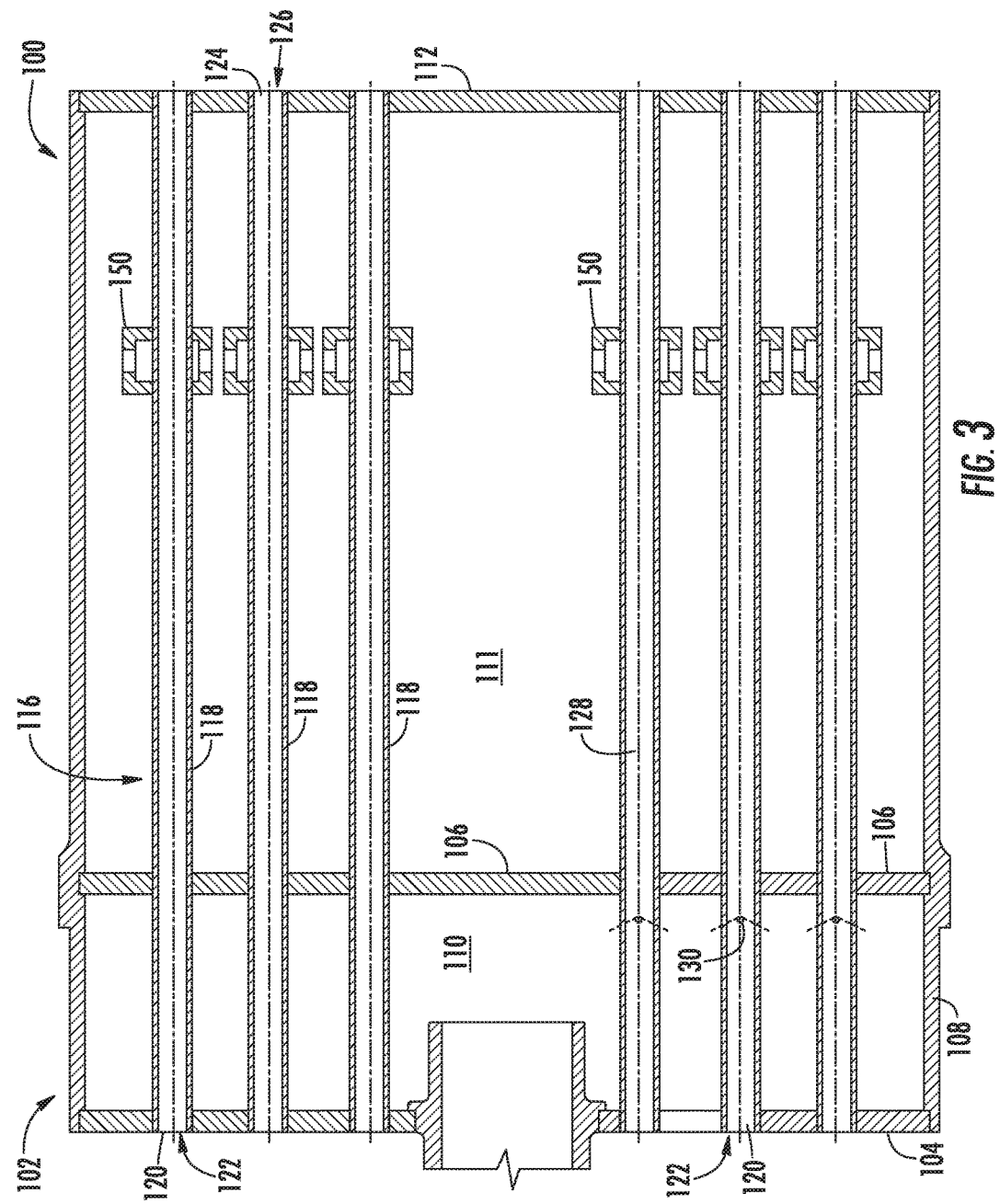
FIG. 3 is a cross sectioned side view of a portion of an exemplary bundled tube type fuel nozzle assembly as shown in FIG. 2, according to at least one embodiment of the present disclosure.

FIG. 3 provides a cross sectioned side view of a portion of an exemplary fuel nozzle assembly 100 as shown in FIG. 2, according to at least one embodiment of the present disclosure. Various embodiments of the combustor 16 may include different arrangements of the fuel nozzle assembly 100 and is not limited to any particular arrangement unless otherwise specified in the claims. For example, in particular configurations as illustrated in FIG. 2, the fuel nozzle assembly 100 includes multiple wedge shaped fuel nozzle segments annularly arranged about centerline 46. In some embodiments, fuel nozzle assembly 100 may further include a circular shaped fuel nozzle segment centered on centerline 46. In particular embodiments, the fuel nozzle assembly 100 may form an annulus or fuel nozzle passage about a center fuel nozzle 50.

In at least one embodiment, as shown in FIG. 3, the fuel nozzle assembly 100 and/or each fuel nozzle segment includes a fuel plenum body 102 having a forward or upstream plate 104, an aft plate 106 axially spaced from the forward plate 104 and an outer band or sleeve 108 that extends axially between the forward plate 104 and the aft plate 106. A fuel plenum 110 is defined within the fuel plenum body 102. In particular embodiments, the forward plate 104, the aft plate 106 and the outer sleeve 108 may at least partially define the fuel plenum 110. In particular embodiments, fluid conduit 50 may extend through the forward plate 104 to provide fuel to the fuel plenum 110. In various embodiments, the fuel nozzle assembly 100 includes a cap plate 112 axially spaced from the aft plate 106. An air plenum 111 is defined between the aft plate 106 and cap plate 112. A hot side 114 of the cap plate 112 is generally disposed adjacent or proximate to the combustion chamber 42.

As shown in FIG. 3, the fuel nozzle assembly 100 includes a tube bundle 116 comprising a plurality of tubes 118. Each tube 118 extends through the forward plate 104, the fuel plenum 110, the air plenum 111, the aft plate 106 and the cap plate 112. The tubes 118 are fixedly connected to and/or form a seal against the aft plate 106. For example, the tubes 118 may be welded, brazed or otherwise connected to the aft plate 106. Each tube 118 includes an air inlet 120 defined at an upstream end 122 of each respective tube 118 and an outlet 124 defined at a downstream end 126 of each respective tube 118. The downstream end portion 126 extends through a corresponding tube opening (not shown) in the cap plate 112, the tube opening being sized to define a circumferentially continuous radial gap between an outer surface of the tube 118 and an inner surface of the corresponding tube opening. The circumferentially continuous radial gap permits compressed air 26 to flow around the tube from the air plenum 111 towards the combustion chamber 42, thereby cooling the downstream end portions 126 of the tubes 118.

Each tube 118 defines a respective premix flow passage 128 through the fuel nozzle assembly 100, for premixing the gaseous fuel 28 (FIG. 1) with the compressed air 26 (FIG. 1) within mixing tube 118 before it is directed into a combustion zone 42 defined downstream from the fuel nozzle. In particular embodiments, one or more tubes 118 of the plurality of tubes 118 is in fluid communication with the fuel plenum 110 via one or more fuel ports 130 defined within the respective tube(s) 118.

As described above, the downstream end portions of tubes 118 are not attached at the cap plate 112, as such, the tube 118 may be described as "cantilevered." During operation of fuel nozzle assemblies, combustion dynamics may cause oscillations of the various parts of the combustor 16, which in turn may impact one another. For example, the cantilevered tubes 118, particularly the downstream end portion 126 of each tube 118, may move radially with respect to a centerline of each respective tube 118 resulting in contact between the tubes 118 and the corresponding tube openings in the cap plate 112. As another example, the fuel nozzle assembly 100 may impact a liner or head end 38 of combustor 16. Such impacts may cause undesirable wear on the various parts due to the physical force of the impact and/or increased thermal loading on upstream components of combustor 16. For example, combustion gases 30 (FIG. 1) create an elevated temperature in the downstream end portion 126 of each tube 118 such that impact of tubes 118 on cap plate 112 may increase thermal loading of the cap plate 122.

Figure 4:
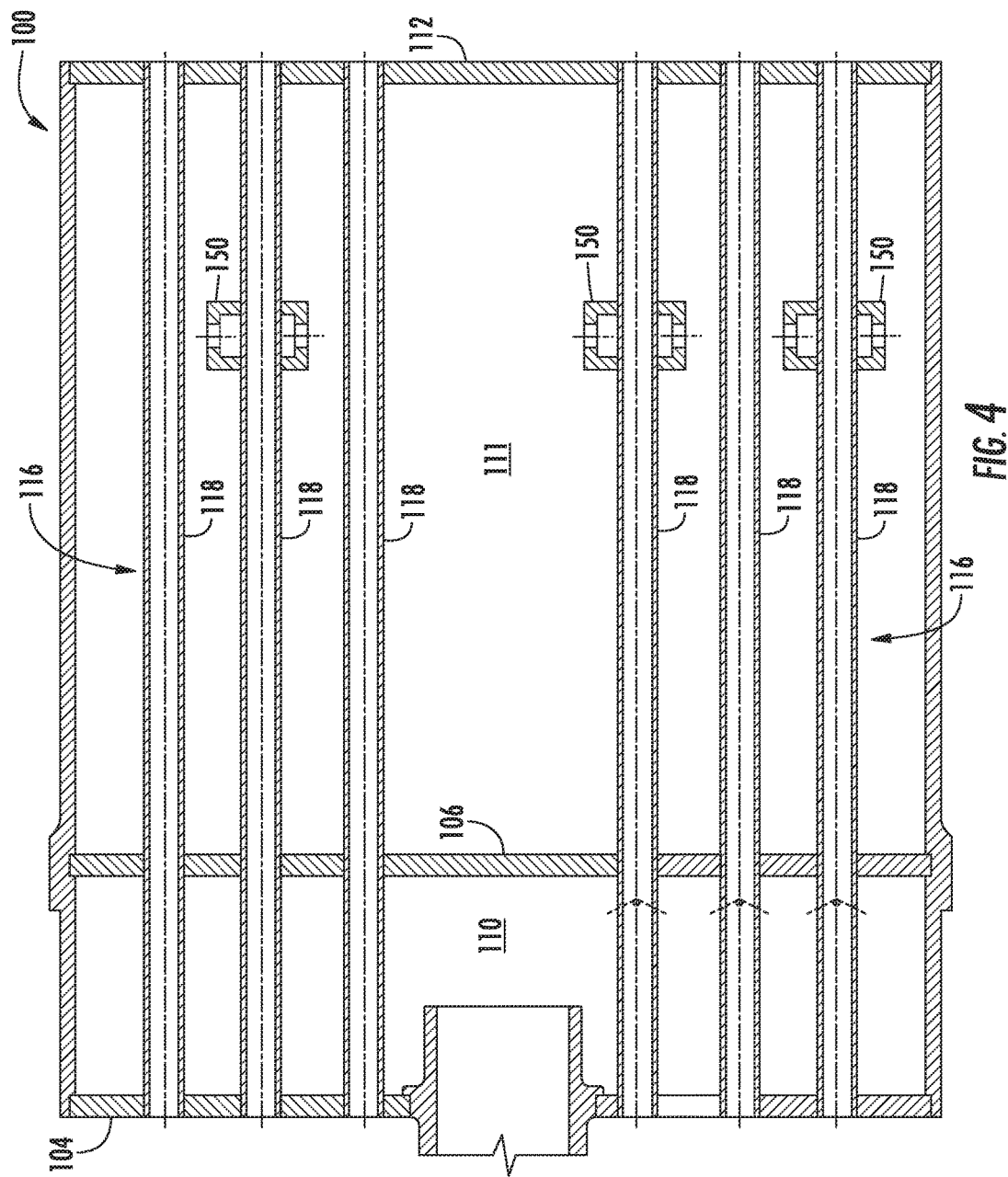
FIG. 4 is a cross sectioned side view of a portion of an exemplary bundled tube type fuel nozzle assembly as shown in FIG. 2, according to at least one embodiment of the present disclosure.

In various embodiments of the present disclosure, as shown in FIG. 3, the fuel nozzle assembly 100 includes one or more resonators 150 disposed between the aft plate 106 and the cap plate 112. In some example embodiments, the one or more resonators 150 can be axially spaced from the cap plate 112 and upstream of the mixing tube outlet to avoid or minimize exposure of the resonator 150 to heat from combustion zone 42. In some embodiments, for example as illustrated in FIG. 3, the number of resonators 150 is equal to the number of tubes 118, and there is a one-to-one correspondence between tubes 118 and resonators 150. In other words, each tube 118 extends through and is surrounded by a single resonator 150 and each resonator 150 has only a single tube extending through it. In other embodiments disclosed herein, the correspondence between tubes 118 and resonators 150 may vary. In some embodiments, for example as illustrated in FIG. 4, there may be fewer resonators 150 than tubes 118, and each resonator 150 may have only a single tube 118 extending through it and some tubes 118 may not extend through a resonator 150. Further as illustrated in FIG. 4, in some embodiments where less than all of the tubes have a corresponding resonator, the subset of tubes 118 not extending through and surrounded by a resonator 150 may include tubes 118 from more than one bundle 116.

Figure 5:
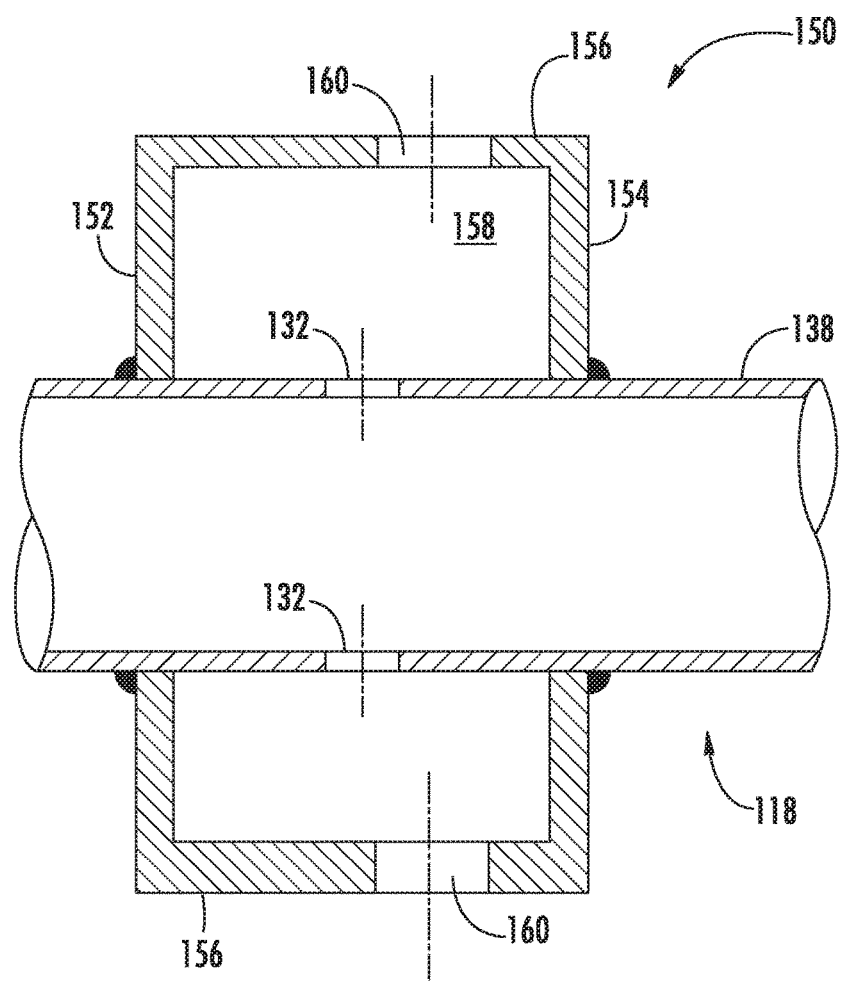
FIG. 5 is a cross sectioned side view of a portion of an exemplary bundled tube type fuel nozzle assembly as shown in FIGS. 3 and 4, according to at least one embodiment of the present disclosure.

In some exemplary embodiments, as illustrated in FIG. 5, the resonator 150 includes first and second sidewalls 152 and 154 and an outer wall 156. The resonator walls 152, 154, and 156 define a resonator chamber 158. In some embodiments such as illustrated in FIG. 5, a single tube 118 passes through a resonator 150. Also illustrated in FIG. 5, when a tube 118 passes through a resonator 150, an outer surface 138 of mixing tube 118 can be sealingly fixed to the first sidewall 152 and second sidewall 154, such as by brazing or welding. In other embodiments, mixing tube 118 and resonator 150 may be formed as a unitary piece, e.g., by additive manufacturing. In some embodiments wherein a mixing tube 118 passes through a resonator 150, the mixing tube 118 may include one or more openings 132 in fluid communication with the resonator chamber 158. Typically in such cases the tube opening(s) 132 may be generally offset with respect to the centerline of a pressure inlet 160 of the resonator 150, or in some embodiments the tube openings 132 may be aligned with pressure inlets 160. The relative dimensions and location of opening 132 and the volume of the resonator chamber 158 may be specified based at least in part on particular frequencies to be addressed within the combustor 16. For example, although opening 132 is illustrated as normal to the walls of mixing tube 118, openings 132 may also be oblique and/or tapered. As another example, the shape of sidewalls 152 and 154 may be concave, convex, etc., in order to provide the desired resonator chamber 158 volume, e.g., within a given clearance between adjacent tubes 118. Pressure inlet 160 permits pressurized air 26 to enter resonator chamber 158 to provide positive pressure therein relative to the fuel/air mixture within mixing tube 118 so as to avoid or minimize escape of the fuel/air mixture from tube 118 upstream of combustion zone 42. As such, the size of pressure inlet 160 is preferably kept to a minimum, e.g., just large enough to pressurize resonator chamber 158 without introducing excessive amounts of air into the resonator which may also infiltrate mixing tubes 118 therefrom. Nonetheless, a certain amount of additional air infiltrating the mixing tubes 118 may provided improved mixing as a result of increased turbulent intensity. Although pressure inlets 160 are shown in the outer wall 156 in the illustrated embodiments, it is also possible within the scope of the present subject matter to form pressure inlets in sidewalls 152 and 154 as well as or instead of in outer wall 156

Figure 6:
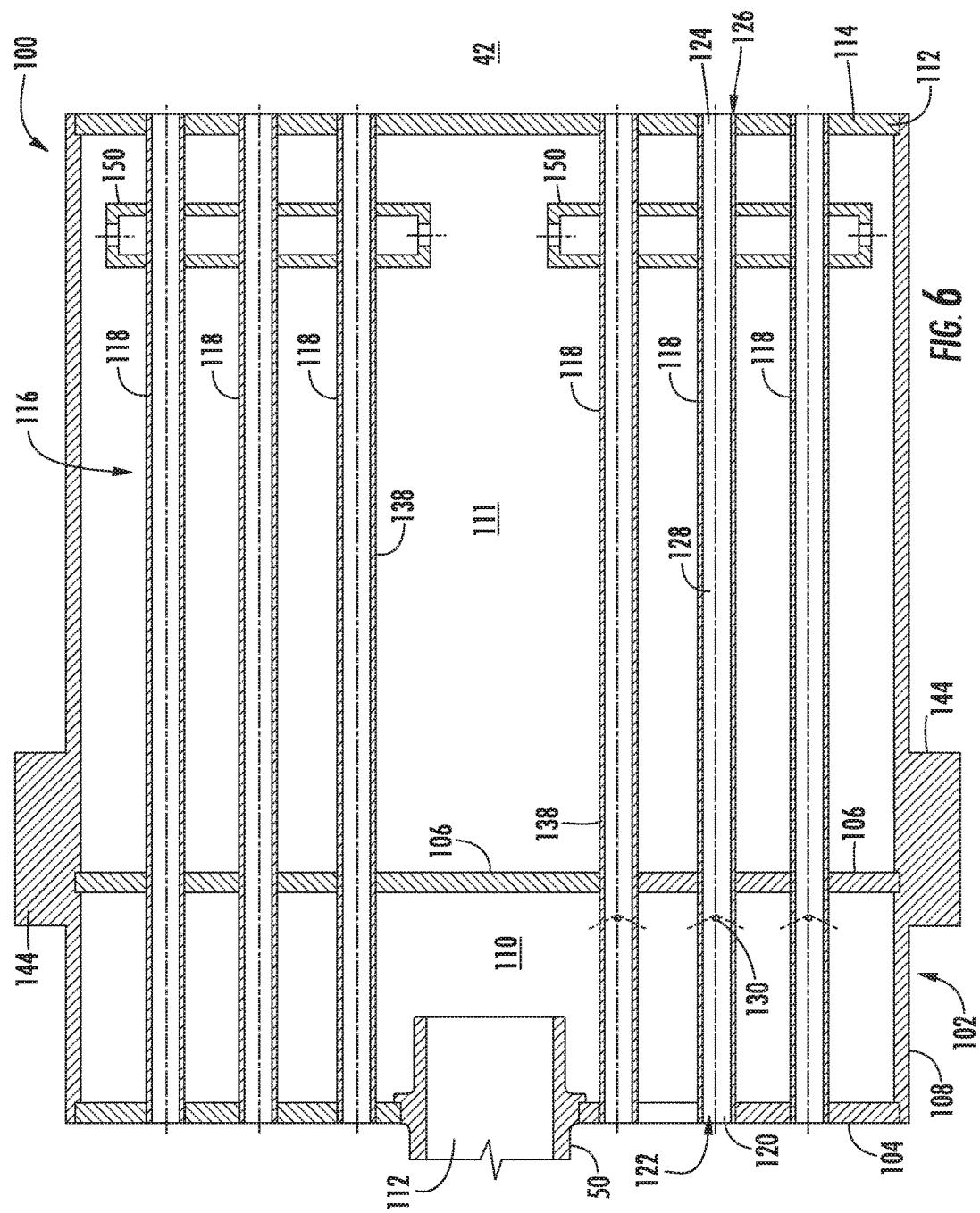
FIG. 6 is a cross sectioned side view of a portion of an exemplary bundled tube type fuel nozzle assembly as shown in FIG. 2, according to at least one embodiment of the present disclosure.
Figure 7:
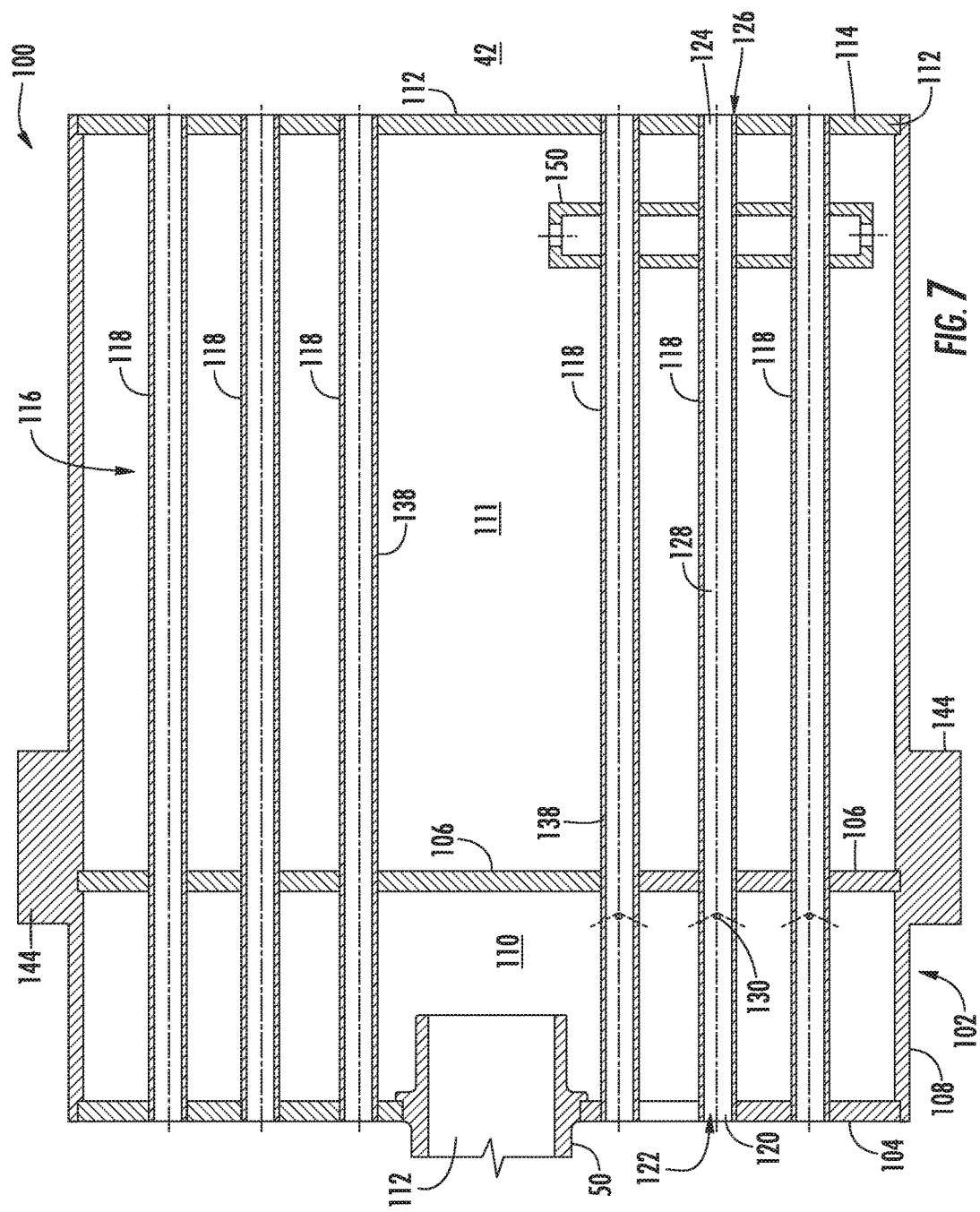
FIG. 7 is a cross sectioned side view of a portion of an exemplary bundled tube type fuel nozzle assembly as shown in FIG. 2, according to at least one embodiment of the present disclosure.

In various embodiments of the present disclosure, for example as illustrated in FIG. 6, the fuel nozzle assembly 100 includes fewer resonators 150 than tubes 118 and more than one tube 118 extends through each resonator 150, while each tube 118 extends through and is surrounded by a single one of the multiple resonators 150. In some embodiments, for example as illustrated in FIG. 7, there may be fewer resonators 150 than tubes 118, and some tubes 118 may not extend through a resonator 150. Further as illustrated in FIG. 7, in some embodiments where less than all of the tubes have a corresponding resonator, the subset of tubes 118 not extending through and surrounded by a resonator 150 may include tubes 118 from a single bundle 116 while all of the tubes 118 from another bundle 116 extend through and are surrounded by a resonator 150.

Figure 8:
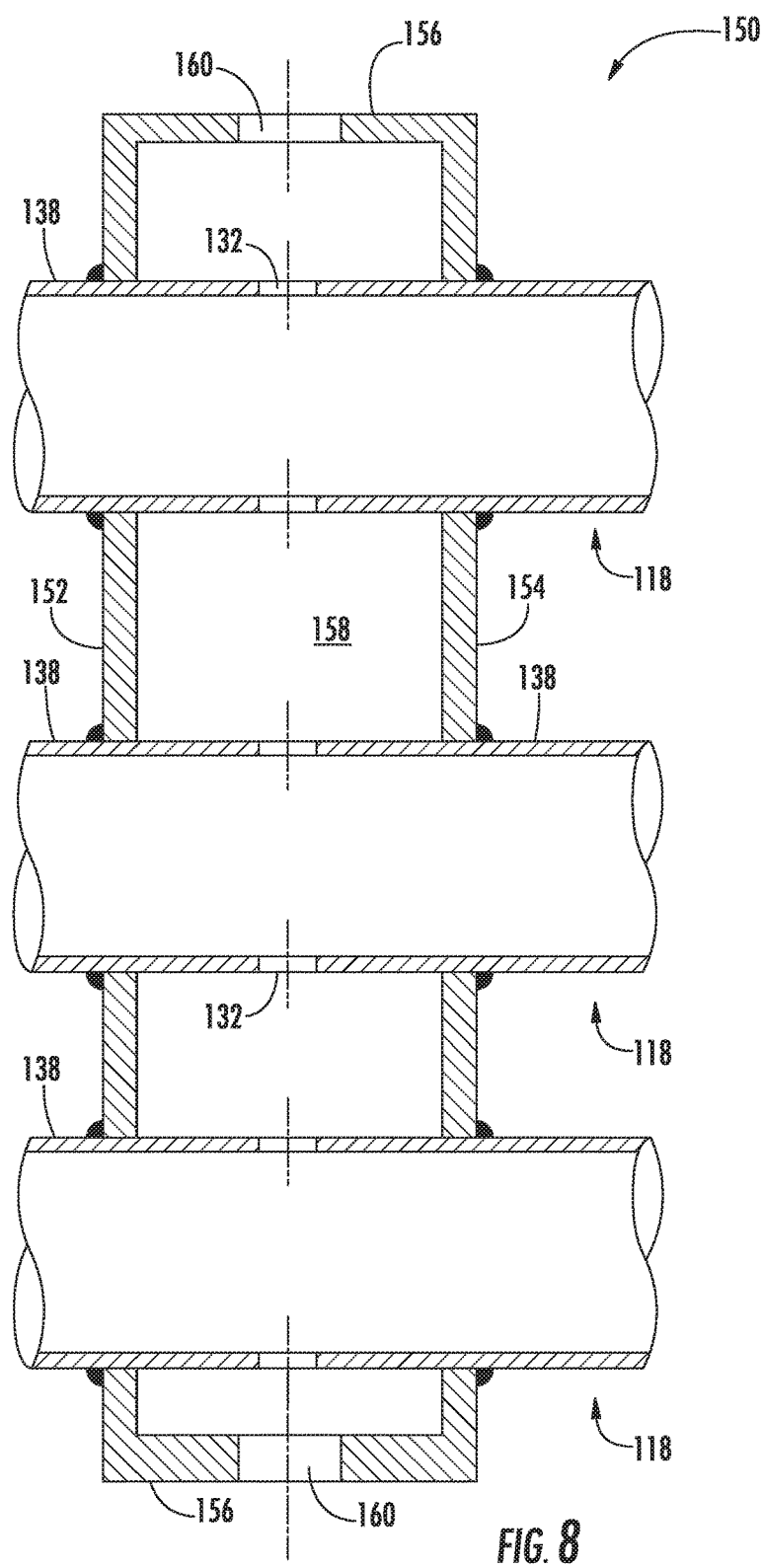
FIG. 8 is a cross sectioned side view of a portion of an exemplary bundled tube type fuel nozzle assembly as shown in FIGS. 6 and 7, according to at least one embodiment of the present disclosure.

FIG. 8 provides a cross sectioned side view of a portion of an exemplary fuel nozzle assembly 100 as shown in FIG. 6 or 7. In particular, FIG. 8 provides an illustration of an example resonator 150 which can be used in such embodiments. In some embodiments, resonator 150 may have more than one mixing tube 118 passing through it and each of the mixing tubes 118 passing through the resonator may be in fluid communication with resonator chamber 158 via one or more openings 132 in each mixing tube 118. Typically in embodiments such as those illustrated in FIGS. 6 and 7, although more than one mixing tube 118 passes through each resonator 150, less than all of the mixing tubes 118 within a nozzle pass through a resonator 150. For example, in some embodiments such as illustrated in FIG. 6, a first set of mixing tubes may pass through one resonator 150 while a second set of mixing tubes may pass through another resonator 150. Alternatively, as illustrated in FIG. 7, in some embodiments, a first set of mixing tubes 118 may pass through a resonator 150 while a second set of mixing tubes 118 may not. Also illustrated in FIG. 8, the resonator 150 includes first and second sidewalls 152 and 154 and an outer wall 156. The resonator walls 152, 154, and 156 define a resonator chamber 158, and each tube 118 that passes through resonator 150, may have an outer surface 138 of mixing tube 118 sealingly fixed to the first sidewall 152 and second sidewall 154, such as by brazing or welding.

Figure 9:
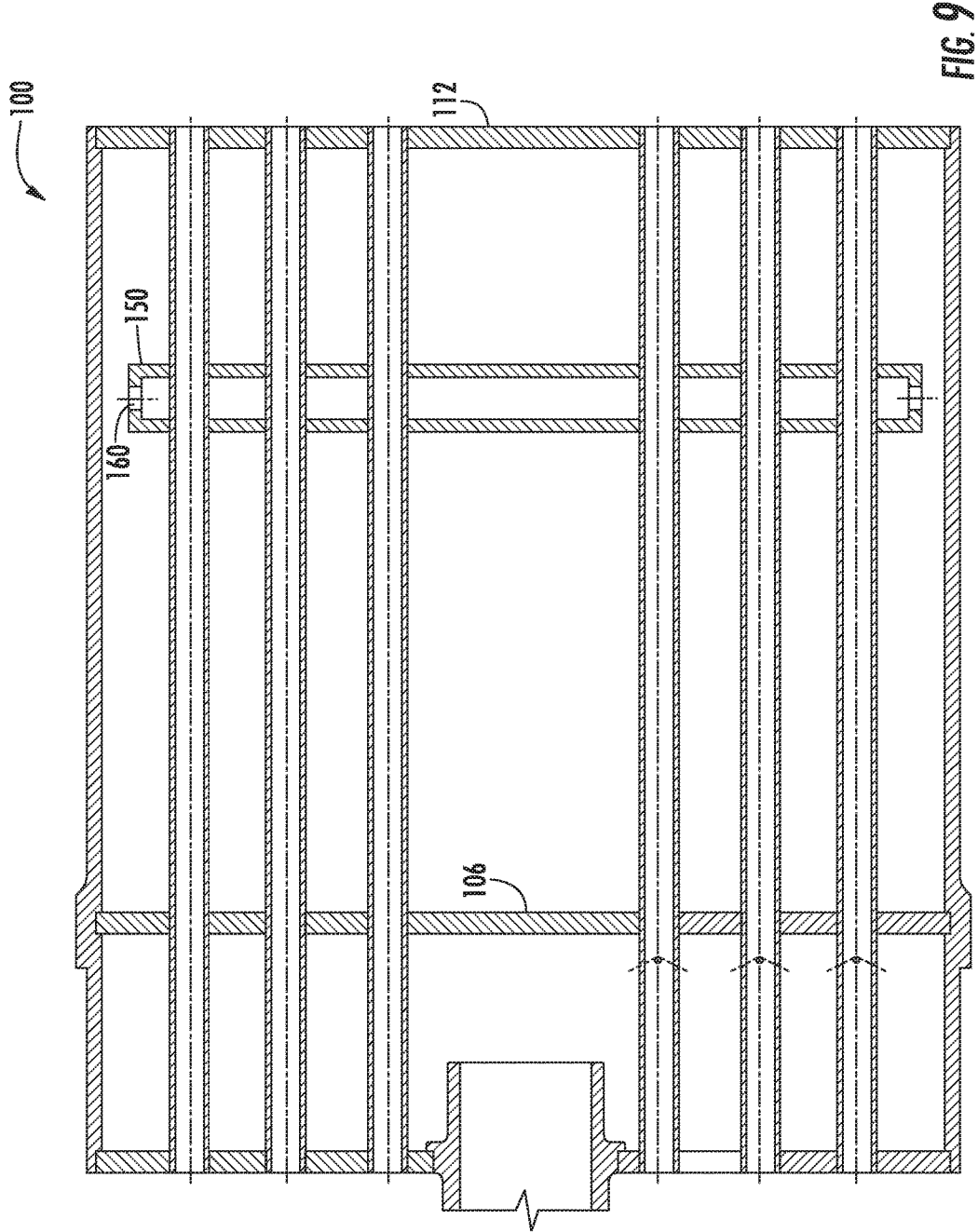
FIG. 9 is a cross sectioned side view of a portion of an exemplary bundled tube type fuel nozzle assembly as shown in FIG. 2, according to at least one embodiment of the present disclosure.
Figure 10:
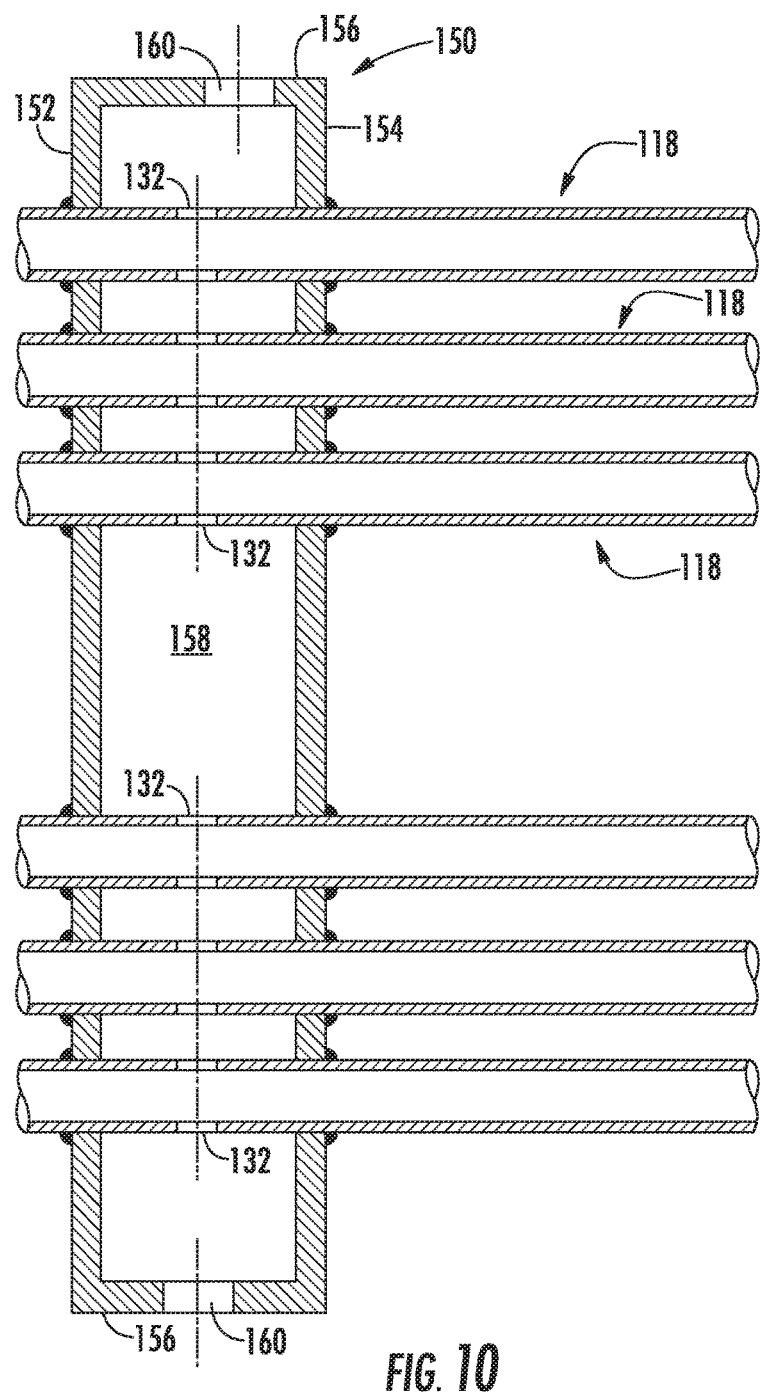
FIG. 10 is a cross sectioned side view of a portion of an exemplary bundled tube type fuel nozzle assembly as shown in FIG. 9, according to at least one embodiment of the present disclosure.

In some embodiments of the present disclosure, for example as illustrated in FIGS. 9 and 10, a single resonator 150 may be provided. Further, in embodiments where more than one tube 118 passes through each resonator 150, and in particular where there is only one single resonator 150 per nozzle, for example as in FIGS. 9 and 10, all of the tubes 118 in the fuel nozzle assembly 100 may pass through and be surrounded by the resonator 150.

The various embodiments illustrated and described herein provide various technical benefits over exiting fuel nozzle assemblies. For example, resonator(s) 150 dampens acoustical vibrations in the cantilevered tubes 118 which reduces tube wear at the joint formed between each respective tube 118 and the aft plate 106, thereby reducing the potential for fuel leakage from the fuel plenum 110 and/or prevents the tubes 118 from vibrating against the cap plate 112 during operation of the combustor 16, thus improving tube life. In addition, the ratio between the tube opening(s) 132 and the volume of resonator chamber 158 may be modified depending on combustion dynamics or mechanical vibrations of a particular gas turbine. In some embodiments, multiple resonators 150 of various sizes may be provided, e.g., resonators 150 in one fuel nozzle segment may be sized to dampen one frequency range while resonators 150 in an adjacent fuel nozzle segment may be sized for another range.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A bundled tube fuel nozzle assembly comprising:
   a fuel plenum body comprising a forward plate extending in a radial direction, an aft plate axially spaced from the forward plate and extending in a radial direction, an outer sleeve extending in an axial direction between the forward plate and the aft plate, and a fuel plenum defined by the forward plate, the aft plate and the outer sleeve;
   a cap plate axially spaced from the aft plate, an air plenum defined between the aft plate and the cap plate;
   a plurality of mixing tubes extending through the fuel plenum body, each of the mixing tubes comprising an air inlet, a fuel port in fluid communication with the fuel plenum, and an outlet downstream of the aft plate; and
   at least one resonator positioned between the aft plate and the cap plate surrounding at least one mixing tube of the plurality of mixing tubes, the at least one resonator comprising a first sidewall extending in a radial direction, a second sidewall axially spaced from the first sidewall and extending in a radial direction, an outer wall extending in an axial direction between the first sidewall and the second sidewall, a resonator chamber defined by the first sidewall, the second sidewall, and the outer wall, at least one inlet into the resonator chamber in fluid communication with the air plenum;
   wherein the at least one mixing tube surrounded by the at least one resonator comprises an opening in fluid communication with the resonator chamber.

2. The bundled tube fuel nozzle assembly of claim 1, wherein the at least one resonator comprises an equal number of resonators as the plurality of mixing tubes, a single mixing tube of the plurality of mixing tubes extends through each resonator, each mixing tube extends through a single one of the resonators, and each of the plurality of mixing tubes further comprises an outer surface sealingly fixed to the first sidewall and the second sidewall of the respective resonator and the opening of each of the plurality of mixing tubes is disposed in the outer surface of the mixing tube between the first sidewall and the second sidewall of the respective resonator.

3. The bundled tube fuel nozzle assembly of claim 1, wherein the at least one resonator comprises fewer resonators than mixing tubes, wherein the plurality of mixing tubes comprises a first set of mixing tubes and a second set of mixing tubes, a single mixing tube of the first set of mixing tubes extends through each resonator, each of the first set of mixing tubes extends through a single one of the resonators, each of the first set of mixing tubes further comprises an outer surface sealingly fixed to the first sidewall and the second sidewall of the respective resonator and the opening of each of the first set of mixing tubes is disposed in the outer surface thereof between the first sidewall and the second sidewall of the respective resonator, and none of the second set of mixing tubes extends through a resonator.

4. The bundled tube fuel nozzle assembly of claim 1, wherein the at least one resonator comprises fewer resonators than mixing tubes and two or more mixing tubes extend through each resonator, each mixing tube extends through a single one of the resonators and each mixing tube further comprises an outer surface sealingly fixed to the first sidewall and the second sidewall of the respective resonator and the opening of each mixing tube is disposed in the outer surface thereof between the first sidewall and the second sidewall of the respective resonator.

5. The bundled tube fuel nozzle assembly of claim 1, wherein the at least one resonator comprises fewer resonators than mixing tubes, two or more mixing tubes extend through each resonator, the plurality of mixing tubes comprises a first set of mixing tubes and a second set of mixing tubes, each of the first set of mixing tubes extends through a single one of the resonators, each of the first set of mixing tubes further comprises an outer surface sealingly fixed to the first sidewall and the second sidewall of the respective resonator and the opening of each of the first set of mixing tubes is disposed in the outer surface thereof between the first sidewall and the second sidewall of the respective resonator, and none of the second set of mixing tubes extends through a resonator.

6. The bundled tube fuel nozzle assembly of claim 1, wherein the at least one resonator comprises a single resonator, each of the plurality of mixing tubes extends through the single resonator and each of the plurality of mixing tubes further comprises an outer surface sealingly fixed to the first sidewall and the second sidewall of the resonator and the opening of each mixing tube is disposed in the outer surface thereof within the resonator chamber of the resonator.

7. A combustor, comprising:
   an end cover coupled to an outer casing;
   a bundled tube fuel nozzle assembly disposed within the outer casing and coupled to the end cover, wherein the bundled tube fuel nozzle assembly comprises:
   a fuel plenum body comprising a forward plate extending in a radial direction, an aft plate axially spaced from said forward plate and extending in a radial direction, an outer sleeve extending in an axial direction between the forward plate and the aft plate, and a fuel plenum defined by the forward plate, the aft plate and the outer sleeve;
   a cap plate axially spaced from the aft plate, an air plenum defined between the aft plate and the cap plate;
   a plurality of mixing tubes extending through the fuel plenum body, each of the mixing tubes comprising an air inlet, a fuel port in fluid communication with the fuel plenum, and an outlet downstream of the aft plate; and
   at least one resonator positioned between the aft plate and the cap plate surrounding at least one mixing tube of the plurality of mixing tubes, the at least one resonator comprising a first sidewall extending in a radial direction, a second sidewall axially spaced from the first sidewall and extending in a radial direction, an outer wall extending in an axial direction between the first sidewall and the second sidewall, a resonator chamber defined by the first sidewall, the second sidewall, and the outer wall, at least one inlet into the resonator chamber in fluid communication with the air plenum;

wherein the at least one mixing tube surrounded by the at least one resonator comprises an opening in fluid communication with the resonator chamber.

8. The combustor of claim 7, wherein the at least one resonator comprises an equal number of resonators as the plurality of mixing tubes, a single mixing tube of the plurality of mixing tubes extends through each resonator, and each of the plurality of mixing tubes further comprises an outer surface sealingly fixed to the first sidewall and the second sidewall of the respective resonator and the opening of each of the plurality of mixing tubes is disposed in the outer surface of the mixing tube between the first sidewall and the second sidewall of the respective resonator.

9. The combustor of claim 7, wherein the at least one resonator comprises fewer resonators than mixing tubes, the plurality of mixing tubes comprises a first set of mixing tubes and a second set of mixing tubes, a single mixing tube of the first set of mixing tubes extends through each resonator, each of the first set of mixing tubes further comprises an outer surface sealingly fixed to the first sidewall and the second sidewall of the respective resonator and the opening of each of the first set of mixing tubes is disposed in the outer surface thereof between the first sidewall and the second sidewall of the respective resonator, and none of the second set of mixing tubes extends through a resonator.

10. The combustor of claim 7, wherein the at least one resonator comprises fewer resonators than mixing tubes and two or more mixing tubes extend through each resonator, each mixing tube extends through a single one of the resonators and each mixing tube further comprises an outer surface sealingly fixed to the first sidewall and the second sidewall of the respective resonator and the opening of each mixing tube is disposed in the outer surface thereof between the first sidewall and the second sidewall of the respective resonator.

11. The combustor of claim 7, wherein the at least one resonator comprises fewer resonators than mixing tubes, two or more mixing tubes extend through each resonator, the plurality of mixing tubes comprises a first set of mixing tubes and a second set of mixing tubes, each of the first set of mixing tubes extends through a single one of the resonators, each of the first set of mixing tubes further comprises an outer surface sealingly fixed to the first sidewall and the second sidewall of the respective resonator and the opening of each of the first set of mixing tubes is disposed in the outer surface thereof between the first sidewall and the second sidewall of the respective resonator, and none of the second set of mixing tubes extends through a resonator.

12. The combustor of claim 7, wherein the at least one resonator comprises a single resonator, each of the plurality of mixing tubes extends through the single resonator and each of the plurality of mixing tubes further comprises an outer surface sealingly fixed to the first sidewall and the second sidewall of the resonator and the opening of each mixing tube is disposed in the outer surface thereof within the resonator chamber.

13. A gas turbine, comprising:
a compressor;
a turbine;
a combustor disposed downstream from the compressor and upstream from the turbine, the combustor comprising:
an end cover coupled to an outer casing;
a bundled tube fuel nozzle assembly disposed within the outer casing and coupled to the end cover, wherein the bundled tube fuel nozzle assembly comprises:
a fuel plenum body comprising a forward plate extending in a radial direction, an aft plate axially spaced from said forward plate and extending in a radial direction, an outer sleeve extending in an axial direction between the forward plate and the aft plate, and a fuel plenum defined by the forward plate, the aft plate and the outer sleeve;
a cap plate axially spaced from the aft plate, an air plenum defined between the aft plate and the cap plate;
a plurality of mixing tubes extending through the fuel plenum body, each of the mixing tubes comprising an air inlet, an outlet downstream of the aft plate, and a fuel port in fluid communication with the fuel plenum; and
at least one resonator positioned between the aft plate and the cap plate surrounding at least one mixing tube of the plurality of mixing tubes, the at least one resonator comprising a first sidewall extending in a radial direction, a second sidewall axially spaced from the first sidewall and extending in a radial direction, an outer wall extending in an axial direction between the first sidewall and the second sidewall, a resonator chamber defined by the first sidewall, the second sidewall, and the outer wall, and at least one inlet into the resonator chamber in fluid communication with the air plenum;
wherein the at least one mixing tube surrounded by the at least one resonator comprises an opening in fluid communication with the resonator chamber.

14. The gas turbine of claim 13, wherein the at least one resonator comprises an equal number of resonators as the plurality of mixing tubes, a single mixing tube of the plurality of mixing tubes extends through each resonator, and each of the plurality of mixing tubes further comprises an outer surface sealingly fixed to the first sidewall and the second sidewall of the respective resonator and the opening of each of the plurality of mixing tubes is disposed in the outer surface of the mixing tube between the first sidewall and the second sidewall of the respective resonator.

15. The gas turbine of claim 13, wherein the at least one resonator comprises fewer resonators than mixing tubes, the plurality of mixing tubes comprises a first set of mixing tubes and a second set of mixing tubes, a single mixing tube of the first set of mixing tubes extends through each resonator, each of the first set of mixing tubes further comprises an outer surface sealingly fixed to the first sidewall and the second sidewall of the respective resonator and the opening of each of the first set of mixing tubes is disposed in the outer surface thereof between the first sidewall and the second sidewall of the respective resonator, and none of the second set of mixing tubes extends through a resonator.

16. The gas turbine of claim 13, wherein the at least one resonator comprises fewer resonators than mixing tubes and two or more mixing tubes extend through each resonator, each mixing tube extends through a single one of the resonators and each mixing tube further comprises an outer surface sealingly fixed to the first sidewall and the second sidewall of the respective resonator and the opening of each mixing tube is disposed in the outer surface thereof between the first sidewall and the second sidewall of the respective resonator.

17. The gas turbine of claim 13, wherein the at least one resonator comprises fewer resonators than mixing tubes, two or more mixing tubes extend through each resonator, the plurality of mixing tubes comprises a first set of mixing tubes and a second set of mixing tubes, each of the first set of mixing tubes extends through a single one of the resonators, each of the first set of mixing tubes further comprises an outer surface sealingly fixed to the first sidewall and the second sidewall of the respective resonator and the opening of each of the first set of mixing tubes is disposed in the outer surface thereof between the first sidewall and the second sidewall of the respective resonator, and none of the second set of mixing tubes extends through a resonator.

18. The gas turbine of claim 13, wherein the at least one resonator comprises a single resonator, each of the plurality of mixing tubes extends through the single resonator and each of the plurality of mixing tubes further comprises an outer surface sealingly fixed to the first sidewall and the second sidewall of the resonator and the opening of each mixing tube is disposed in the outer surface thereof within the resonator chamber.

* * * * *